Aug. 15, 1939.   R. S. McNEIL   2,169,880
COFFEE MAKER
Filed Sept. 10, 1937
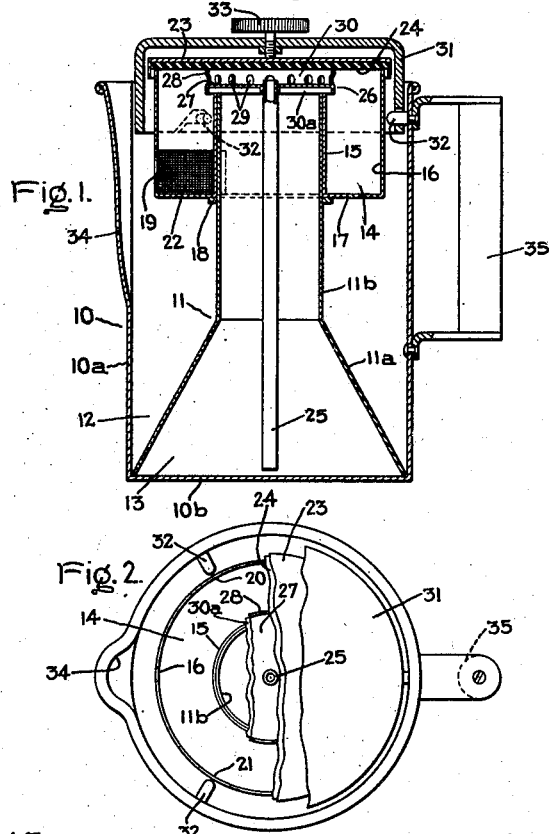
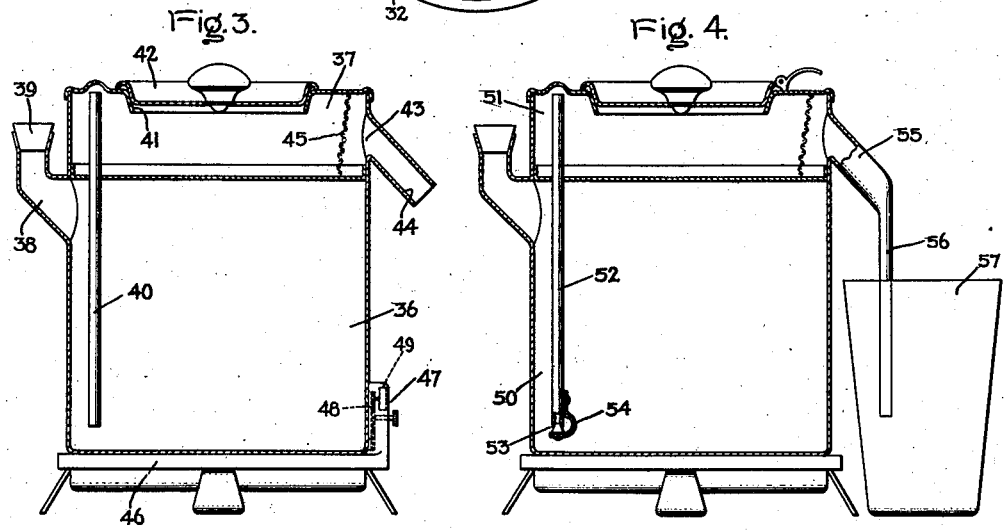
Inventor:
Roderick S. McNeil,
by Harry E. Dunham
His Attorney.

Patented Aug. 15, 1939

2,169,880

UNITED STATES PATENT OFFICE 2,169,880

COFFEE MAKER

Roderick S. McNeil, Bridgeport, Conn., assignor to General Electric Company, a corporation of New York Application September 10, 1937, Serial No. 163,279

5 Claims. (Cl. 53—3)

This invention relates to coffee makers, and it has for its object the provision of an improved device of this character.

This invention contemplates an improved coffee maker which heats the water to the proper temperature, and brings it into contact with the coffee grounds under such conditions that a coffee brew is produced having an excellent flavor, and one that is free from coffee grounds.

In accordance with this invention in one form thereof, the water is heated to the proper temperature and is forced under pressure into a container in which the coffee grounds are placed. The container is provided with a discharge port before which is placed a dam which consists of a screen having a very fine mesh. The mesh is so fine that coffee grounds will not flow through it but will build up a dam of grounds so that the coffee brew must be forced through the dam and screen under pressure. In other words, the screen and layer of coffee grounds covering it set up a back pressure to the admission of water to the ground coffee container. The coffee grounds are thus steeped by heated water under a slight pressure.

Preferably, the ground coffee container will discharge into a receptacle that is separate from the water heating vessel, the ground coffee container receiving the heated water from one vessel and discharging the prepared coffee brew into another.

For a more complete understanding of this invention, reference should be had to the accompanying drawing in which Fig. 1 is a vertical sectional view of a coffee maker embodying this invention; Fig. 2 is a plan view of the coffee maker of Fig. 1, parts being broken away so as to illustrate certain details of construction; Fig. 3 is a vertical sectional view illustrating a coffee maker of modified form arranged in accordance with this invention; and Fig. 4 is a vertical sectional view illustrating still another modified form of this invention.

Referring more particularly to Figs. 1 and 2, this invention has been shown as applied to a coffee maker having a relatively deep vessel 10, preferably having a cylindrical side wall 10a and a bottom wall 10b. Inserted in this vessel is a cylindrical partition 11 dividing it into inner and outer compartments 12 and 13. As shown, the lower section 11a of the dividing member has the shape of a truncated cone the base of which rests on the bottom wall 10b of the vessel 10, and the upper end of which merges into an upright smaller cylindrical part 11b. The upper end of the portion 11b is open, as shown, and is brought up to substantially the level of the upper edge of the vessel 10. The chamber 13 constitutes a water heating compartment, while the chamber 12 serves to receive the finished coffee brew.

Positioned within the compartment 12 is a ground coffee compartment 14 for receiving the coffee grounds. The compartment 14 is of annular form and is defined by substantially cylindrical spaced apart inner and outer walls 15 and 16 joined at the bottom by a bottom wall 17. The inner wall 15 is arranged to be fitted relatively closely to the upright section 11b of the dividing member, as shown. The container is supported on this section in any suitable manner, as by means of a seat 18 secured to the member and upon which the coffee container rests. As shown, when the coffee container is on its seat 18, the upper edge of the inner wall 15 comes substantially to the upper edge of the portion 11b, while the outer wall 16 extends somewhat above the plane of this upper edge and that of the vessel 10.

It will be observed that the inner and outer walls 15 and 16 of the coffee container as well as the bottom wall 17 are imperforate except for a relatively small area of the outer wall 16 which is open to define a discharge port 19. As shown, this port is arranged at one side of and adjacent the bottom wall 17, and it extends through a portion of the circumference of the outer wall 16 between the points 20 and 21. The port 19 is closed by a vertical screen dam 22 which preferably will be made of metal and which will have a very fine mesh, such as 200 to the square inch. The container 14 is closed at the top by an imperforate top wall 23 which carries on its under side a sealing member 24 arranged to engage the upper open edge of the container when the cover is placed on it. It will be observed that when the cover is in place, the container is a closed compartment, except for the port 19.

Heated water under pressure is introduced to the chamber 14 from the water heating compartment 13 by means of a delivery tube 25 which is inserted through the upper open mouth of the inner compartment, as shown, and which is supported by means of a member 26. The member 26 has a supporting plate 27 through which the upper end of the tube 25 is directed, as shown in Fig. 1, and to which the tube is secured in any suitable manner, as by brazing or welding. Extending upwardly from the periphery of the plate 27 is a circular wall 28 which is provided with a series of spaced openings 29. The plate 27 and the upright wall 28 define a chamber 30 which is open at the top, but which is closed by the sealing member 24 when the cover 23 is placed on the coffee container. A sealing member 30a is carried under the plate 27 so as to bear on the upper edge of the section 11b and also that of the inner wall 15.

The vessel 10 is provided with a cover member 31 which may be secured to the vessel in any suitable manner as by means of bayonet joints 32. The cover 31 carries a screw 33 threaded through it substantially centrally thereof, as shown in Fig. 1, and whose lower end is adapted to bear upon the cover 23 for the coffee compartment to force the cover into liquid-tight engagement with the side walls of the compartment. The parts are so arranged that when the screw 33 is turned inwardly to effect this seal between the cover 23 and its compartment, it at the same time effects a liquid-tight seal between the sealing member 30a and the upper edges of the inner wall 15 of the coffee compartment and the member 11b.

In the operation of the device, it will be understood that to make coffee, the covers 31 and 23 and the member 27 carrying the delivery tube 25 will be removed from the vessel 10. The proper amount of water will then be placed into the compartment 13, and the proper amount of coffee grounds will be placed in the ground coffee container 14. This container will then be placed on its seat 18, and the delivery tube 25 will then be inserted into the compartment 13 with the sealing member closing the top of the compartment. The lid 23 will then be placed on the coffee container and finally the lid 31 will be assembled with the vessel 10 and locked to it by means of the bayonet connection 32. The screw 33 will then be turned inwardly so as to seal the vessel 13 and the coffee container.

When heat is applied to the bottom wall 10b of the coffee maker, the water within the inner compartment will be heated and as its temperature is raised vapor pressure will be generated within the compartment. Eventually when this vapor pressure attains a predetermined value, which will occur substantially at the boiling point of the water, the heated water will be forced up through the tube 25 and into the compartment 30 from which it will discharge radially through the openings 29. The water that is thus discharged is spread over the entire upper area of the coffee grounds placed within the compartment 14. The water that is forced into the compartment steeps the grounds placed within it to make the coffee brew. The discharge of the prepared brew from the compartment is resisted by the screen 22 whose mesh, as pointed out previously, is so fine that it will cause a back pressure to be generated in the compartment. The screen is so fine that water supplied to the compartment 14 will not flow readily through it by gravity, but must be forced through it under a pressure the magnitude of which depends upon the fineness of the screen. It is important that the screen have such a fineness that it will retain even the finer of the coffee grounds. These will collect in a layer before the screen and will form a dam or filter of the grounds themselves. The pressure necessary to force the coffee brew through this layer of coffee grounds and the fine screen is supplied by the generation of pressure in the chamber 13.

It will be observed in view of this arrangement that the heated water is forced through the ground coffee in the compartment 14 under pressure and that the coffee brew which is made by this steeping of the coffee grounds is forced through the port 19 and into the outer compartment 12. The coffee brew is thus kept separate from the water heating vessel.

The outer compartment 12 is provided with a discharge spout 34 from which the coffee brew may be poured. And the coffee maker is provided with a handle 35 to facilitate pouring the coffee.

The lower end of the tube 25, as shown, is spaced somewhat from the bottom wall 10b of the coffee maker so that some water will be left in the water heating compartment 13 after the coffee is made. This water may be heated and used to keep the coffee brew warm. The steam generated by heating this water is forced through the coffee container which dries the coffee grounds and prevents dripping from the container after the coffee is made.

It will be understood that any suitable heating means may be used. Thus, for example, the coffee maker may be provided with an electrically heated hot plate.

In Fig. 3, there is illustrated a modified form of this invention. In this case, the coffee maker is provided with compartments 36 and 37 arranged one above the other, as shown. The lower compartment 36 which is the larger of the two is the water heating compartment, while the upper compartment 37 receives the coffee grounds. The lower compartment 36 is provided with a filler spout 38 which is closed by a stopper 39. The vessel is otherwise closed except for its connection with the ground coffee receptacle by means of a water delivery tube 40. The ground coffee container 37 is provided with an opening 41 at the top through which the coffee grounds are inserted, and which normally is tightly closed by a cover 42. The container is provided in its side wall with a discharge port 43 that discharges into a spout 44. Positioned over the port 43 is a screen dam 45 which has essentially the same characteristics as the screen dam 22 of the first form. Preferably and as shown, the tube 40 will enter the compartment 37 at one side thereof and the discharge port 43 will be positioned at the opposite side.

The water in the vessel 36 is heated by the electrically heated hot plate 46. This hot plate is controlled by a thermostatic switch 47 comprising a bi-metallic thermostat bar 48 that operates a switch 49. The switch is connected in the energizing circuit of the plate 46 and when closed completes this circuit and when opened by the thermostat opens the circuit.

In operation, the water that is placed within the compartment 36 is heated by the plate 46 and forced up through the tube 40 into the ground coffee compartment 37 where the ground coffee is steeped. The coffee brew that is formed is forced through the screen dam 45 and out through the discharge spout 44. A suitable receptacle (not shown) will be placed under the spout to collect the coffee brew. Here again, the screen dam 45 sets up a back pressure so that the grounds are steeped under pressure.

When substantially all of the water above the level of the lower end of the tube 40 has been forced out of the vessel 36, the temperature of the lower walls of this vessel will increase rapidly to the temperature at which the thermostatic switch 47 functions to disconnect the heating element 46.

In the form of the invention, shown in Fig. 4, the parts are substantially the same as shown in Fig. 3. Thus, the water heating compartment 50 is connected with the coffee compartment 51 by means of a delivery tube 52, all arranged as are the corresponding parts shown in Fig. 3. Here however, the lower end of the delivery tube 52 is closed by means of a thermostatically operated valve 53. As shown, the valve member is normally closed by means of a bimetallic strip 54. The valve remains closed until the water attains substantially the boiling point when the thermostat opens the valve and permits delivery of the hot water to the coffee compartment.

In this form of the invention, a discharge spout 55 terminates in a downwardly depending extension 56 which will extend into a vessel 57 placed under the spout for the reception of the coffee brew. The advantage of this construction over that shown in Fig. 3 is that after the coffee has been made and the residual water in the vessel 50 below the lower end of the tube 52 is heated, the steam that is generated will be forced down through the member 56 and into the brew in the vessel 57. The steam in bubbling up through the brew keeps it warm.

In each case, the water is heated almost to the boiling temperature and is then forced into and through the coffee grounds. The pressure is sufficiently high to quickly force the water through the coffee maker so that it contacts the coffee grounds for but a relatively short interval of time. The time of contact is such that only the desirable essences are obtained; the bitter oils are not absorbed. And in each case the grounds are substantially dried by the passage of steam through them after the major portion of the water has been transferred from the water heating compartment.

While I have shown particular embodiments of my invention, it will be understood, of course, that I do not wish to be limited thereto since many modifications may be made, and I, therefore contemplate by the appended claims to cover any such modifications as fall within the true spirit and scope of my invention.

What I claim as new and desire to secure by Letters Patent of the United States, is:

1. A coffee maker comprising a compartment for heating water having an opening in its upper end through which water is introduced, a water delivery tube of relatively small diameter inserted through said opening, a support for said delivery tube arranged to be fitted to said opening to close it to prevent loss of pressure from the compartment, a water delivery chamber above said opening and connected with the discharge of said tube, the delivery chamber providing for radial disposition of the water fed to it from the tube, a closed container for coffee grounds around the compartment and arranged so that the water disposed by the delivery chamber is spread over the upper area of said container, the container having a discharge port and a fine mesh screen over said port.

2. A coffee maker comprising a pair of open-top compartments arranged in substantially concentric relation, the inner compartment constituting a water heating vessel and the outer a vessel for receiving coffee brew, a ground coffee compartment arranged within the space between said compartments and having a port discharging into the outer compartment, a relatively small water delivery tube inserted through the top of said inner compartment, a cover for said top supporting the tube and having a water delivery chamber connected with the tube and providing for radial disposition of the water fed into it from the tube to the coffee container, a common lid for said coffee container and water delivery chamber, and means forcing said lid into liquid-tight fit with said members.

3. A coffee maker comprising a pair of open-top compartments arranged in substantially concentric relation, the inner compartment constituting a water heating vessel and the outer vessel for receiving coffee brew, a ground coffee container arranged within the space between said compartments and having a port discharging into the outer compartment, a relatively small water delivery tube inserted through the top of said inner compartment, a cover for said top supporting the tube and having a water delivery chamber connected with the tube providing for radial disposition to the coffee container of the water fed into the delivery chamber from the tube, a common lid for said coffee container and water delivery chamber arranged to have a liquid-tight fit with said members, a cover for said outer compartment, means securing said cover to said outer compartment, and a screw in said cover arranged to be turned inwardly to force said lid into liquid-tight fit with said coffee container and water discharge member and to force the latter member into liquid-tight fit with said inner compartment.

4. A coffee maker comprising inner and outer substantially concentric open-top compartments, the inner constituting a water heating vessel, a discharge spout on the outer compartment, a ground coffee container around the inner compartment discharging into the outer, a lid for said ground coffee container having a sealing member engaging the mouth of said container, a second lid for said outer compartment over the first lid, means securing said second lid to the outer compartment, means carried by the second lid for forcing said first lid into liquid-tight fit with said coffee container, a member interposed between the upper end of said inner compartment and said first lid having a sealing member arranged to be fitted to and close the mouth of said inner compartment and having a chamber closed at the top by the sealing member on the first lid, a water delivery tube carried by said member inserted into said inner compartment and discharging into said chamber, and the chamber having a series of lateral ports discharging into said coffee container.

5. A coffee maker comprising a pair of open-top compartments arranged in substantially concentric relation, the inner compartment constituting a water heating vessel and the outer a vessel for receiving coffee brew, a ground coffee compartment arranged within the space between said compartments and having a port discharging into the outer compartment, a relatively small water delivery tube inserted through the top of said inner compartment, a cover for said top supporting the tube and having a water delivery chamber connected with the tube and providing for the discharge of the water fed into it from the tube to the coffee container, a common lid for said coffee container and water delivery chamber, and means forcing said lid into liquid-tight fit with said members.

RODERICK S. McNEIL.